US008165008B2

(12) United States Patent
Ridel et al.

(10) Patent No.: US 8,165,008 B2
(45) Date of Patent: *Apr. 24, 2012

(54) HIGH-DATA-RATE COMMUNICATION LINK USING MULTIPLE LOWER RATE MODEMS

(75) Inventors: Eran Ridel, Rosh Ha'Ayin (IL); Jonathan Friedman, Tel Aviv (IL); Jeffrey Davidson, Kochav Yair (IL)

(73) Assignee: Provigent Ltd. (IL)

( * ) Notice: Subject to any disclaimer, the term of this patent is extended or adjusted under 35 U.S.C. 154(b) by 311 days.

This patent is subject to a terminal disclaimer.

(21) Appl. No.: 12/416,941

(22) Filed: Apr. 2, 2009

(65) Prior Publication Data

US 2009/0196313 A1 Aug. 6, 2009

Related U.S. Application Data

(63) Continuation of application No. 11/711,570, filed on Feb. 26, 2007, now Pat. No. 7,532,562.

(51) Int. Cl.
*H04J 9/00* (2006.01)
*H04J 3/04* (2006.01)
*H04J 3/02* (2006.01)
*H04L 27/28* (2006.01)

(52) U.S. Cl. ......... 370/204; 370/536; 370/537; 375/260

(58) Field of Classification Search .......... 370/203, 370/204, 208, 359, 419, 421, 430, 463, 508, 370/535–536, 538; 375/260, 344, 354, 355–365
See application file for complete search history.

(56) References Cited

U.S. PATENT DOCUMENTS

| 5,249,200 | A  | * | 9/1993  | Chen et al. ............... 375/285 |
| 5,809,070 | A  |   | 9/1998  | Krishnan et al. |
| 6,647,059 | B1 |   | 11/2003 | Faruque |
| 6,959,011 | B2 | * | 10/2005 | Takizawa et al. ......... 370/509 |
| 7,106,818 | B2 |   | 9/2006  | Balakrishnan |
| 7,133,441 | B1 |   | 11/2006 | Barlev et al. |
| 7,324,437 | B1 | * | 1/2008  | Czylwik et al. .......... 370/210 |
| 7,394,876 | B2 | * | 7/2008  | Sestok et al. ............ 375/340 |
| 7,426,201 | B2 | * | 9/2008  | Kim et al. ............... 370/335 |

(Continued)

FOREIGN PATENT DOCUMENTS

WO 2006097735 A2 9/2006

OTHER PUBLICATIONS

International Application PCT/IL2007/001446 Search Report dated Aug. 25, 2008.

(Continued)

*Primary Examiner* — Warner Wong
(74) *Attorney, Agent, or Firm* — Sterne, Kessler, Goldstein & Fox PLLC (57) ABSTRACT

A method for communication includes receiving a composite signal, which carries data at a first data rate and includes multiple sub-signals that are interleaved in a time domain and are separated by boundary indicators. The received composite signal is demultiplexed into the sub-signals by automatically detecting the boundary indicators between the sub-signals in the composite signal. The sub-signals are demodulated using multiple respective demodulators operating at second data rates that are lower than the first data rate so as to generate respective output data streams. The output data streams are combined so as to reconstruct the data at the first data rate.

32 Claims, 4 Drawing Sheets

U.S. PATENT DOCUMENTS

| | | |
|---|---|---|
| 7,532,562 B2 | 5/2009 | Ridel et al. |
| 2001/0055271 A1* | 12/2001 | Okada et al. .................. 370/206 |
| 2003/0231581 A1 | 12/2003 | Son |
| 2004/0257981 A1* | 12/2004 | Ro et al. ......................... 370/210 |
| 2006/0018347 A1* | 1/2006 | Agrawal ........................ 370/537 |
| 2006/0039273 A1* | 2/2006 | Gore et al. .................... 370/208 |
| 2006/0159120 A1* | 7/2006 | Klm ............................... 370/465 |
| 2006/0171367 A1* | 8/2006 | Wang ............................. 370/342 |
| 2007/0165566 A1* | 7/2007 | Khan et al. .................... 370/329 |
| 2007/0177685 A1* | 8/2007 | Kawauchi ..................... 375/260 |
| 2008/0031126 A1* | 2/2008 | Feher ............................. 370/204 |
| 2008/0130485 A1* | 6/2008 | Yang ............................. 370/208 |
| 2008/0144594 A1* | 6/2008 | Yano et al. .................... 370/342 |
| 2008/0181317 A1* | 7/2008 | Kim ............................... 375/260 |

OTHER PUBLICATIONS

Provigent Inc., "PVG-310 Single Chip Point-to-Point Terminal Modem", 2006.

* cited by examiner

HIGH-DATA-RATE COMMUNICATION LINK USING MULTIPLE LOWER RATE MODEMS

CROSS REFERENCE TO RELATED APPLICATIONS

This application is a continuation of U.S. patent application Ser. No. 11/711,570, filed Feb. 26, 2007, whose disclosure is incorporated herein by reference.

FIELD OF THE INVENTION

The present invention relates generally to communication links, and particularly to methods and systems for transmitting and receiving at high data rates using multiple modems.

BACKGROUND OF THE INVENTION

Several methods and systems are known in the art for transmitting and receiving at a high data rate using multiple lower data rate modems. For example, PCT Publication WO 2006/097735, which is incorporated herein by reference, describes an apparatus and method for processing a high-data-rate signal. The apparatus comprises a plurality of data processing units and switching means to repeatedly switch a received high-data-rate signal between inputs of the plurality of data processing units on a time division basis. Each of the data processing units is operable to process the signal at a data rate lower than the high data rate, and the apparatus further comprises combining means operable to switch between outputs of the plurality of data processing units to form a processed high-data-rate signal. A receiver apparatus is also disclosed, operable to cooperate with the apparatus to receive a processed signal and to undo each of the processing steps performed by the apparatus to convert the processed signal into an original high first data rate signal.

As another example, U.S. Pat. No. 5,809,070, whose disclosure is incorporated herein by reference, describes methods and apparatus for providing high-speed inter-computer data transmission using multiple low speed communication links. At the transmitting site, a high-speed data stream is split into multiple low-speed data streams and multiplexed onto low-speed links. The receiver demultiplexes, buffers and synchronizes the multiple low-speed data streams to recreate the high-speed data stream.

U.S. Pat. No. 6,647,059, whose disclosure is incorporated herein by reference, describes a low-cost data communication system using modems. In the proposed system and method, an incoming binary data stream is split into several parallel sub-streams by an encoding modem. The parallel sub-streams are mapped into a set of unique orthogonal short-codes and then modulated by a bank of modulators. Thereafter, the modulated data is combined and transmitted through a wired communication channel, such as a cable or optical fiber channel. A decoding modem can receive encoding information from the encoding modem and appropriately decode the transmitted information.

SUMMARY OF THE INVENTION

There is therefore provided, in accordance with an embodiment of the present invention, a method for communication, including:

receiving a composite signal, which carries data at a first data rate and includes multiple sub-signals that are interleaved in a time domain and are separated by boundary indicators;

demultiplexing the received composite signal into the sub-signals by automatically detecting the boundary indicators between the sub-signals in the composite signal; and demodulating the sub-signals using multiple respective demodulators operating at second data rates that are lower than the first data rate so as to generate respective output data streams, and combining the output data streams so as to reconstruct the data.

In some embodiments, the composite signal originates from a single transmitter. In an embodiment, the demodulators include burst demodulators. In another embodiment, the demodulators include stream demodulators.

In yet another embodiment, the boundary indicators include silent periods. Automatically detecting the boundary indicators may include calculating an instantaneous power of the received composite signal and detecting the boundary indicators responsively to the calculated instantaneous power.

In still another embodiment, the boundary indicators include sequences of known symbols. Automatically detecting the boundary indicators may include calculating correlations between samples of the received composite signal and between the sequences of the known symbols. Additionally or alternatively, automatically detecting the boundary indicators includes accepting one or more correlation indications from one or more of the multiple demodulators, which indicate a correlation between the sub-signals demodulated by the respective demodulators and between the sequences of the known symbols.

In a disclosed embodiment, the boundary indicators include sequences of known samples having the first data rate, and automatically detecting the boundary indicators includes calculating correlations between samples of the received composite signal and between the sequences of the known samples. In another embodiment, the boundary indicators include sequences of known bits.

In yet another embodiment, demodulating the sub-signals includes recovering a timing of at least one sub-signal by the respective demodulator, and receiving the composite signal includes digitizing the composite signal using an analog-to-digital converter (ADC) and adjusting a sampling clock of the ADC based on the recovered timing.

In still another embodiment, receiving the composite signal includes digitally recovering a timing of the composite signal. In an embodiment, recovering the timing of the composite signal includes estimating a timing offset of at least one sub-signal by the respective demodulator, and correcting a corresponding timing offset in the composite signal using digital interpolation responsively to the calculated timing offset of the at least one sub-signal. In another embodiment, the composite signal includes a sequence of known samples, and recovering the timing of the composite signal includes estimating a timing offset in the composite signal by processing the known samples, and correcting the timing offset in the composite signal by applying digital interpolation to the composite signal.

In some embodiments, at least one of the demodulators includes an adaptive receiver loop used for demodulating the respective sub-signal, and demodulating the sub-signals includes compensating for an error of the adaptive loop accumulated between successive time intervals of the sub-signal. In an embodiment, the adaptive loop includes a phase recovery loop, and compensating for the error includes compensating for a phase error accumulated between the successive time intervals of the sub-signal. Additionally or alternatively, the adaptive loop includes a timing recovery loop, and compensating for the error includes compensating for a timing error accumulated between the successive time intervals of the sub-signal. In a disclosed embodiment, at least two of the second data rates are different from one another.

There is additionally provided, in accordance with an embodiment of the present invention, a method for communication, including:

demultiplexing an input data stream having a first data rate into multiple sub-streams having respective second data rates that are lower than the first data rate;

modulating the sub-streams using respective multiple modulators, which operate at the second data rates;

interleaving the modulated sub-streams in a time-domain to produce a modulated composite signal;

inserting boundary indicators between the modulated sub-streams in the composite signal; and transmitting the composite signal over a communication link.

In some embodiments, the boundary indicators include at least one indicator type selected from a group of indicator types consisting of silent periods, sequences of known symbols, sequences of known samples and sequences of known bits.

In another embodiment, modulating the sub-streams includes causing a spectral response of the composite signal to comply with a given spectral mask by causing the spectral response of each of the sub-streams to comply with a spectrally scaled-down replica of the spectral mask. Causing the spectral response of the composite signal to comply with the given spectral mask may include separating the sub-signals in the time domain with separators, which include at least one separator type selected from a group of types consisting of a guard interval and a symmetric sequence of known symbols.

There is also provided, in accordance with an embodiment of the present invention, a receiver, including:

a front-end, which is arranged to receive a composite signal, which carries data at a first data rate and includes multiple sub-signals that are interleaved in a time domain and are separated by boundary indicators;

a separator, which is arranged to demultiplex the received composite signal into the sub-signals by automatically detecting the boundary indicators between the sub-signals in the composite signal;

multiple demodulators, which operate at second data rates that are lower than the first data rate and are arranged to demodulate the respective sub-signals so as to generate respective output data streams; and a multiplexer, which is configured to combine the output data streams so as to reconstruct the data.

There if further provided, in accordance with an embodiment of the present invention, a transmitter, including:

a demultiplexer, which is arranged to demultiplex an input data stream having a first data rate into multiple sub-streams having respective second data rates that are lower than the first data rate;

multiple modulators, which respectively operate at the second data rates and are arranged to modulate the sub-streams;

a combiner, which is arranged to interleave the modulated sub-streams in a time-domain to produce a modulated composite signal; and a boundary marker, which is arranged to insert boundary indicators between the modulated sub-streams in the composite signal.

In some embodiments, the boundary marker is resident in at least one unit selected from a group of units consisting of the demultiplexer, the modulators and the combiner.

There is additionally provided, in accordance with an embodiment of the present invention, a communication link, including:

a transmitter, which includes multiple modulators and is arranged to demultiplex input data having a first data rate into respective sub-streams having second data rates that are lower than the first data rate, to modulate the sub-streams using the respective modulators that operate at the second data rates, to interleave the modulated sub-streams in a time-domain to produce a modulated composite signal, to insert boundary indicators between the modulated sub-streams in the composite signal and to transmit the composite signal; and a receiver, which includes multiple demodulators that respectively operate at the second data rates and is arranged to receive the composite signal, to demultiplex the received composite signal into the sub-signals by automatically detecting the boundary indicators, to respectively demodulate the sub-signals using the demodulators so as to generate output data streams, and to combine the output data streams so as to reconstruct the input data.

There is also provided, in accordance with an embodiment of the present invention, a method for communication, including:

demultiplexing input data having a first data rate into multiple sub-streams having respective second data rates that are lower than the first data rate;

modulating the sub-streams using respective modulators operating at the second data rates;

interleaving the modulated sub-streams in a time-domain to produce a modulated composite signal;

inserting boundary indicators between the modulated sub-streams in the composite signal;

transmitting the composite signal over a communication channel;

receiving the composite signal transmitted over the communication channel;

demultiplexing the received composite signal into the sub-signals by automatically detecting the boundary indicators;

demodulating the sub-signals using respective demodulators operating at the second data rates so as to generate output data streams; and combining the output data streams so as to reconstruct the input data.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for sending data from a transmitter to a receiver at a high data rate using multiple modems, which operate at a lower data rate. In some embodiments, the transmitter partitions an input data stream into multiple sub-streams. The sub-streams are respectively processed by multiple modulators, each operating at a data rate that is lower than the rate of the input data stream. The transmitter interleaves the outputs of the modulators in the time-domain to produce a modulated composite signal. The outputs of the modulators, i.e. the modulated sub-streams, are referred to herein as sub-signals.

Typically, the transmitter inserts boundary indicators between the sub-signals in the composite signal, in order to enable the receiver to detect these boundaries and differentiate between the different sub-signals. The boundaries can be marked, for example, using silent periods or using known bit or symbol sequences. The composite signal is then transmitted to the receiver.

The receiver receives the composite signal and automatically detects the boundaries between the modulated sub-signals using the boundary indicators. Based on the detected boundaries, the receiver separates the composite signal into the individual sub-signals. The modulated sub-signals are processed by respective demodulators, each operating at a data rate that is lower than the data rate of the composite signal (i.e., the data rate of the input data stream). The receiver multiplexes the outputs of the demodulators, to produce an output data stream that reconstructs the high-data-rate input data stream.

Unlike some known methods in which the input data is partitioned into sub-streams in accordance with a fixed protocol agreed between the transmitter and receiver, the methods and systems described herein enable flexible partitioning of the data among the different modems, without prior coordination of the switching times between the transmitter and receiver.

Several exemplary transmitter and receiver configurations are described hereinbelow. In particular, different receiver mechanisms for detecting the boundaries between sub-signals, and for synchronizing the reception of the different sub-signals, are described. For example, the modems (i.e., modulators and demodulators) in the transmitter and receiver may comprise burst modems or continuously-operating stream modems.

In some cases, the transmitter and receiver may use existing modem devices and circuitry, with little or no modification. For example, some receiver configurations described below use certain synchronization indications provided by the individual demodulators for detecting the boundaries between sub-signals.

System Description

Figure 1:
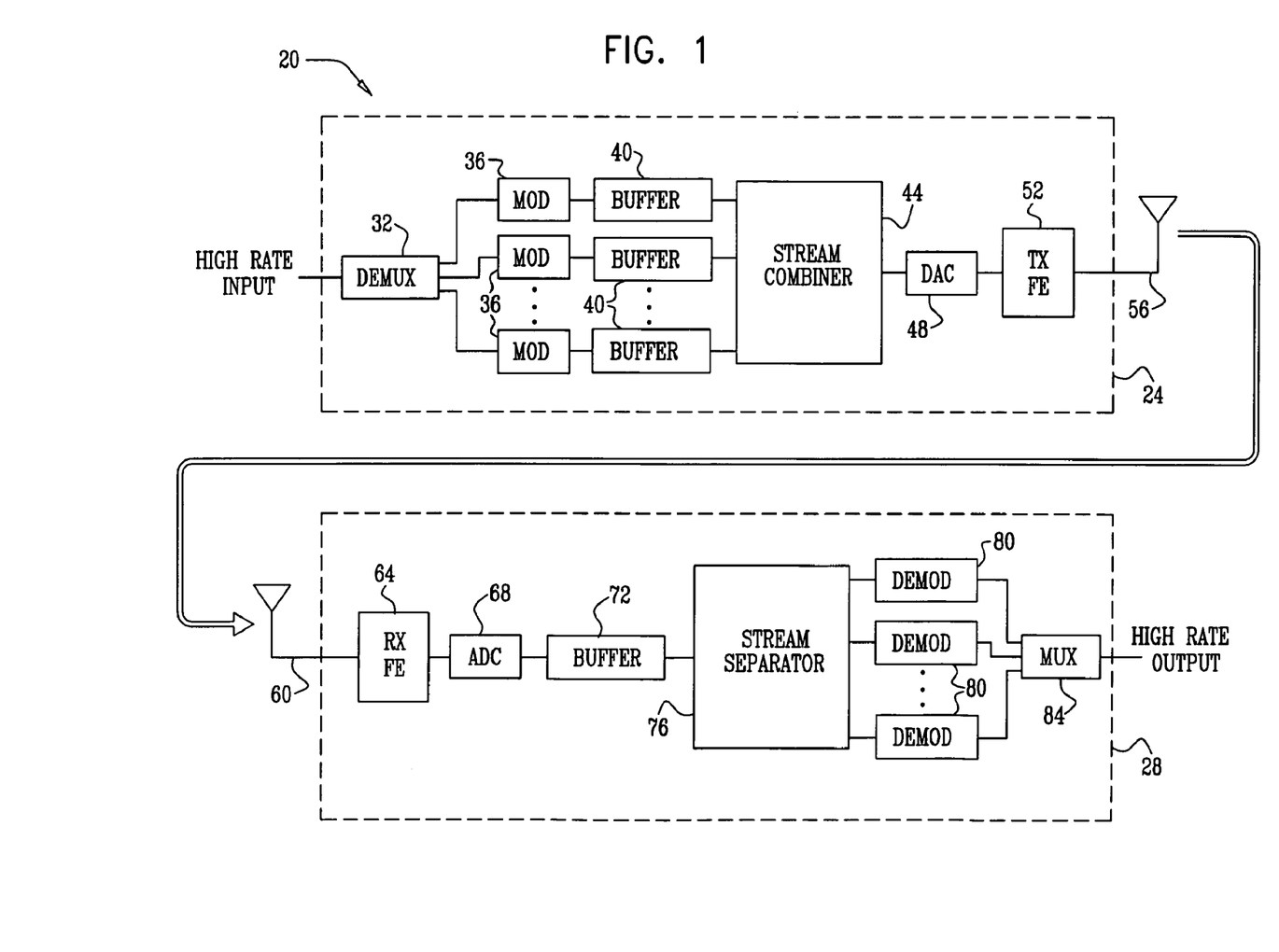
FIG. 1 is a block diagram that schematically illustrates a communication link, in accordance with an embodiment of the present invention.

FIG. 1 is a block diagram that schematically illustrates a communication link 20, in accordance with an embodiment of the present invention. As in the exemplary embodiment shown in FIG. 1, link 20 may comprise a wireless link, such as a point-to-point microwave or millimeter wave link. Alternatively, link 20 may comprise a wireline link, such as a data-over-cable link.

Link 20 comprises a transmitter 24, which transmits data at a high data rate to a receiver 28. For example, the link may carry a Gigabit-Ethernet (GbE) connection, a Synchronous Transfer Mode 4 (STM4) link, an Optical Carrier 12 (OC12) link, or any other suitable high-data-rate connection.

The transmitter accepts an input data stream having a high data rate. A demultiplexer 32 partitions the input data stream into multiple sub-streams. The sub-streams are processed in parallel by respective modulators 36, which operate at data rates that are lower than the data rate of the input data stream. Modulators 36 produce modulated sub-streams, or sub-signals, at their outputs. Each modulator 36 typically encodes its data sub-stream using a Forward Error Correction (FEC) code and modulates the encoded data in accordance with a certain modulation scheme, to produce a sequence of modulated symbols.

The modulators may use any suitable modulation scheme, such as quaternary amplitude modulation (QAM) or phase-shift keying (PSK), and the modulated symbols may be represented by any suitable number of samples per symbol.

In some cases, the modulators add known symbol sequences, such as preambles, to the sub-signals. The use of such symbol sequences is described further below.

The outputs of modulators 36 are buffered by buffers 40. A stream combiner 44 interleaves the multiple streams of modulated samples into a single composite modulated signal. The composite signal thus has a data rate that is substantially equal to the sum of the data rates of the individual modulators. An exemplary process of multiplexing two low-rate modulated sub-signals into a high-rate composite signal is demonstrated in FIG. 2 below.

The composite signal produced by combiner 44 is converted to an analog signal using a digital-to-analog converter (DAC) 48. The analog signal is upconverted to a suitable radio frequency, filtered and amplified by a transmitter front-end (TX FE) 52, and is transmitted to receiver 28 via a transmit antenna 56. At receiver 28, the signal transmitted by transmitter 24 is received by a receive antenna 60. A receiver front-end (RX FE) 64 amplifies and filters the received signal, and downconverts it to a suitable intermediate frequency or to baseband. The signal is then digitized by an analog-to-digital converter (ADC) 68 and the digitized signal is buffered by a buffer 72.

A stream separator 76 separates the received composite signal into the individual modulated sub-signals, using methods that are described in detail hereinbelow. The sub-signals are processed in parallel by multiple demodulators 80, which operate at data rates that are lower than the data rate of the composite signal. Each demodulator 80 typically demodulates and decodes the FEC of its sub-signal. The demodulators may also perform functions such as timing synchronization, carrier recovery, channel equalization and gain control. Typically but not necessarily, each demodulator 80 processes the sub-signal produced by a particular modulator 36 in transmitter 24.

A multiplexer 84 multiplexes the outputs of demodulators 80 to produce an output data stream, which reconstructs the input data stream provided to transmitter 24.

Since modulators 36 and demodulators 80 operate at a reduced data rate, their circuitry can often be simplified and their cost reduced. Additionally, such parallel configuration enables link 20 to operate at data rates, which may be technologically difficult or impossible to achieve using a single modem. In some cases, the parallel configuration enables link 20 to operate at high data rates while reusing known or existing lower data rates modem circuitry or devices.

The terms "high data rate" and "low data rate," which are used herein to respectively describe the data rates of the input data stream and of the individual modulators and demodulators, should be interpreted as relative, not absolute terms. In other words, the input data stream can have any desired data rate (which is the end-to-end data rate of the link), and the individual modulators and demodulators may have any desired data rates, as long as the data rate of each individual modulator and demodulator is lower than the data rate of the input data stream.

Although link 20 is shown in FIG. 1 as a unidirectional link, this configuration is shown purely for the sake of conceptual clarity. In some embodiments, link 20 comprises a bidirectional link, in which two communication systems communicate data to one another. In such configurations, each communication system comprises a transmitter similar to transmitter 24 and a receiver similar to receiver 28. In some cases, a plurality of known bidirectional modem devices can be used as pairs of modulators 36 and demodulators 80 of a particular communication station. For example, Provigent, Inc. (Santa Clara, Calif.) offers a single-chip modem called PVG-310, which can be used for this purpose. Details regarding this device can be found at www.provigent.com/products_310.htm.

Modulators 36 and demodulators 80 may all operate at the same data rate and baud rate, or at different rates. Generally, different modulators may use different modulation schemes, FEC codes and data/baud rates.

In some embodiments, demultiplexer 32 and stream combiner 44 coordinate the order in which the sub-streams are interleaved, so that combiner 44 will combine the sub-signals in the correct order. For example, a suitable control interface can be defined between demultiplexer 32 and combiner 44. In these embodiments, demultiplexer 32 indicates the interleaving order of the sub-streams to combiner 44 using the control interface. This sort of coordination method does not impose overhead or extra bandwidth on the input data stream and sub-streams, but may require control features that are not necessarily supported by modulators 36.

In alternative embodiments, demultiplexer 32 may insert control information (e.g., known bit sequences) to the sub-streams, so as to indicate to combiner 44 how the sub-signals are to be combined. This method is typically transparent to modulators 36, but reduces the available throughput of the link.

Further alternatively, in some cases there is no need for coordination between demultiplexer 32 and combiner 44. For example, in some embodiments is already divided into packets, and demultiplexer 32 separates the input data stream into sub-streams in accordance with this packet structure. Assuming higher layers of the link management are agnostic to the order in which packets are received, there is no need for coordination between demultiplexer 32 and combiner 44.

Figure 2:
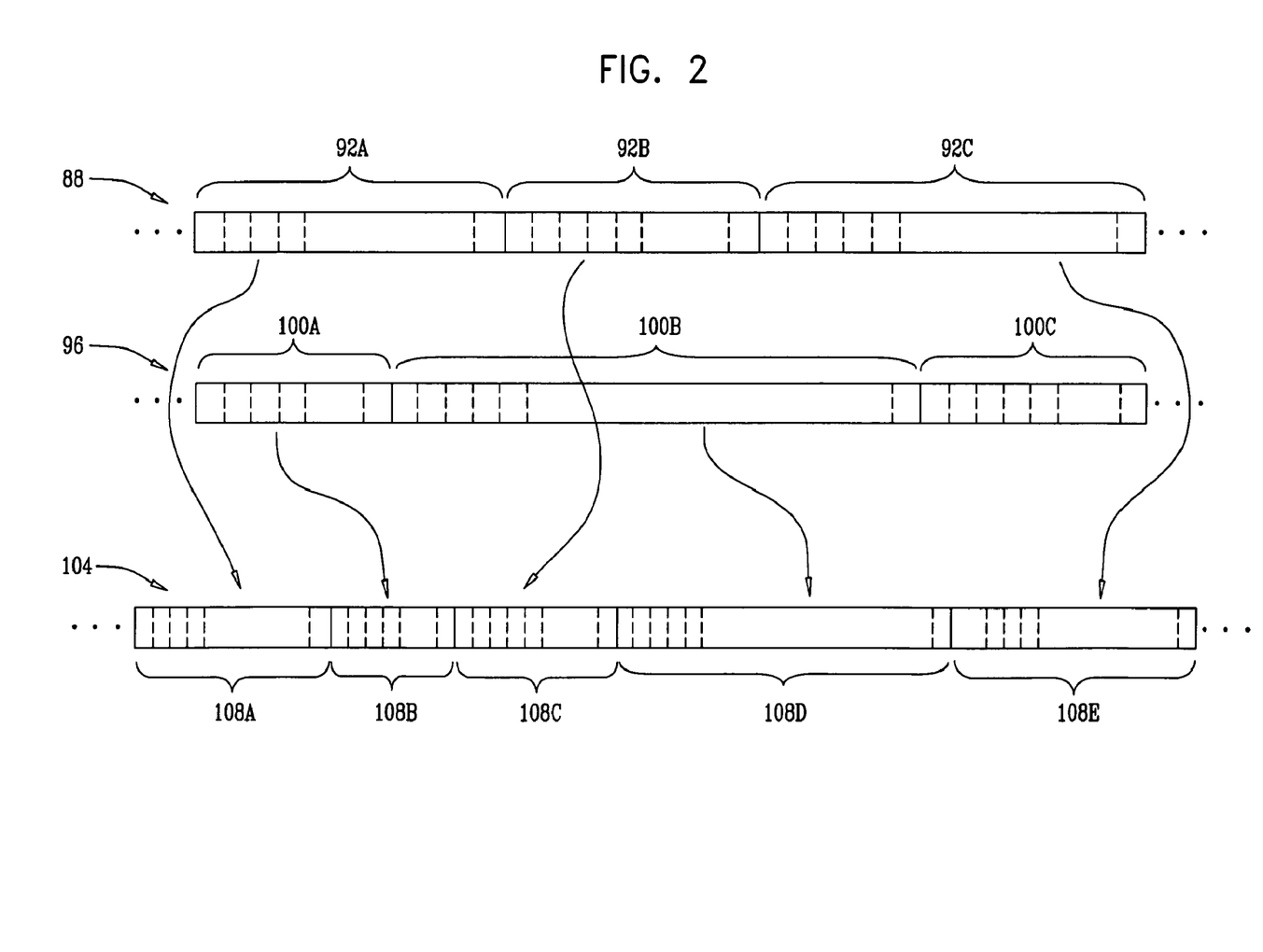
FIG. 2 is a diagram that schematically illustrates conversion of signals produced by multiple modulators into a high-data-rate composite signal, in accordance with an embodiment of the present invention.

FIG. 2 is a diagram that schematically illustrates the conversion of two modulated sub-signals 88 and 96, which are produced by two respective modulators 36, into a high-data-rate modulated composite signal 104, in accordance with an embodiment of the present invention. Sub-signal 88 comprises three frames 92A, 92B and 92C. Sub-signal 96 comprises three frames 100A, 100B and 100C. The frames in each sub-signal may have the same length or may differ in length from one another. Similarly, frames of different sub-signals may have the same length or different lengths. In the present example, the two sub-signals have the same data rate. Generally, however, the sub-signals may have different data rates.

Modulated sub-signals 88 and 96 are interleaved by combiner 44 to produce a composite signal 104, which has a data rate that is twice the data rate of each sub-signal. Frames 108A, 108C and 108E of signal 104 are replicas of frames 92A, 92B and 92C of sub-signal 88 that are played at a double data rate. Similarly, frames 108B and 108D of signal 104 are replicas of frames 100A and 100B of sub-signal 96 that are played at a double data rate (i.e., have a sampling rate that is double the sampling rate of the individual sub-signals).

Since the data rate of composite signal 104 is twice the data rate of sub-signals 88 and 96, it occupies twice the spectral bandwidth in comparison with each sub-signal. Some considerations related to the spectral mask of the composite signal and the individual sub-signals are addressed further below.

Figure 3:
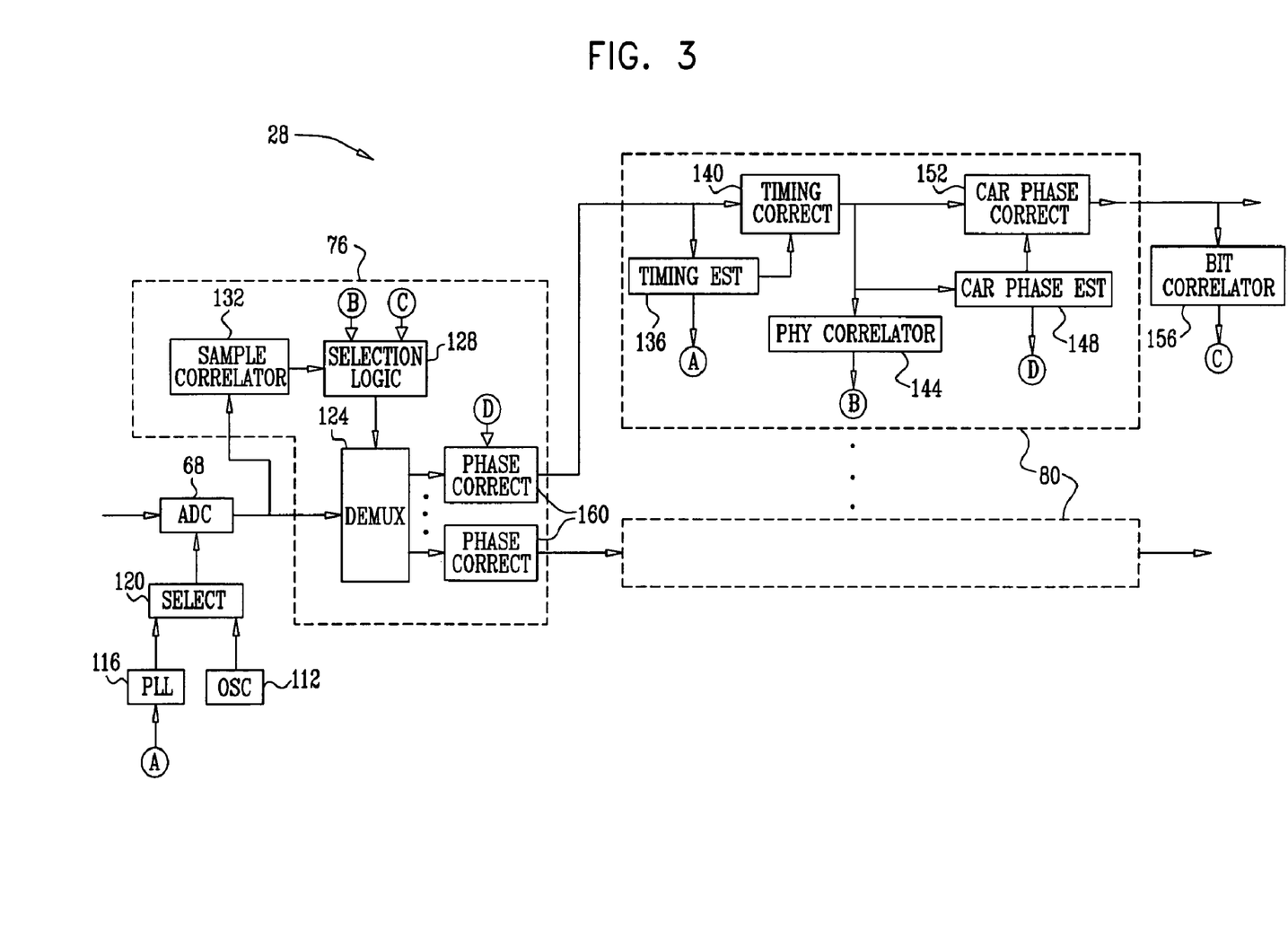
FIG. 3 is a block diagram that schematically illustrates a receiver that uses multiple demodulators, in accordance with an embodiment of the present invention.

FIG. 3 is a block diagram that schematically illustrates details of receiver 28, in accordance with an embodiment of the present invention. In particular, the figure shows details of stream separator 76 and of one of demodulators 80. Several exemplary receiver and transmitter configurations will be described with reference to FIG. 3. Some of the elements shown in the figure are optional or omitted in some configurations.

Modulators 36 and demodulators 80 (collectively referred to as modems) in link 20 may comprise burst modems or stream modems. Burst modems process individual, self-contained bursts of data, which are often processed irrespective of other bursts. Each burst typically comprises a known symbol sequence, such as a preamble or midamble, which is used by adaptive loops or other signal processing processes in the demodulator for recovering the timing and carrier phase of the burst. The receiver loops often process each burst individually, irrespective of previously-received bursts. In some cases, the receiver loops may use estimated parameters from previous bursts in order to improve performance. Burst modems are sometimes able to transmit bursts continuously, so that the transmitted signal appears to be continuous.

Stream modems, on the other hand, process continuous streams of data. Known symbol sequences, such as preambles or midambles, may be periodically inserted into the symbol stream, but the stream usually has no definite logical boundaries. The receiver loops of stream modems often exploit the continuity of the signal. For example, the carrier recovery loop of a stream modem is often slow, and assumes that the carrier phase drifts gradually over time. The transmitter and receiver configurations described herein address both burst modems and stream modems.

ADC Sampling Clock Control

Referring to FIG. 3, the sampling clock of ADC 68 in the receiver may be free-running, or it may track the timing of the received signal, as recovered by one or more of demodulators 80. When the sampling clock of ADC 68 is free-running, a clock oscillator 112 produces the sampling clock and drives ADC 68 via a selector (switch or multiplexer) 120.

Alternatively, the sampling clock of ADC 68 may track, or may be locked to the transmitter clock, as recovered by one or more of demodulators 80. In some embodiments, demodulator 80 comprises a timing estimation unit 136, which estimates the timing offset between demodulator 80 and the corresponding modulator 36 in transmitter 24, based on the received sub-signal. The demodulator further comprises a timing correction unit 140, which accepts the offset value, or a desired correction value, from unit 136 and corrects the demodulator timing accordingly. As a result, the timing of the demodulator tracks the timing of the corresponding modulator. The exemplary timing recovery loop shown in FIG. 3 has a feed-forward configuration. Alternatively, loops having feedback configurations can also be used.

The timing offset or timing correction estimated by unit 136 can sometimes be used to adjust the sampling clock of ADC 68. In FIG. 3, for example, the output of unit 136, denoted 'A', is provided as a reference to a phase-locked loop (PLL) 116, which produces the ADC sampling clock. Selector 120 can be set to drive ADC 68 with this clock.

In some embodiments, the timing of the received signal is recovered digitally. In these embodiments, the timing recovery process involves both phase and frequency recovery. When the modems comprise burst modems, the frequency and the initial phase are typically estimated at the beginning of each sub-signal interval, and then tracked along the interval. When the modems comprise stream modems, the frequency and phase are typically tracked in a continuous manner. In some cases, because of the partial duty-cycle operation of each modem, the demodulator encounters phase discontinuity at the beginning of each sub-signal interval. Means for compensating for this phase discontinuity are described further below.

In some embodiments, such as when the timing of all modulators 36 in transmitter 24 are synchronized to the same clock, the ADC sampling clock can be controlled by the output of a single timing estimation unit 136 in one of demodulators 80. In alternative embodiments, however, different modulators 36 may not be synchronized with one another. In these embodiments, the outputs of all timing estimation units 136 of demodulators 80 can be used, with each timing estimation unit controlling the ADC sampling clock during the interval in which its corresponding sub-signal is being received.

In some embodiments, once the timing of the received signal is recovered, timing correction is applied by digitally interpolating, or resampling, the signal at the receiver. The timing offset (timing error) can be estimated either from one or more of the sub-signals at the demodulators, i.e., at the lower data rates, or from the samples of the composite signal, i.e., at the higher data rate. In these embodiments, the timing offset is then corrected using digital interpolation. Interpolation can be applied either to the symbols of the sub-signals, at the lower data rates, or to the samples of the composite signal, at the higher data rate.

Sub-Signal Boundary Detection Methods

As noted above, the transmitter marks the boundaries between sub-signals by inserting boundary indicators, and the receiver separates the composite signal into the individual sub-signals by automatically detecting the boundary indicators.

Separator 76 comprises a demultiplexer 124, which is controlled by selection logic 128. Separator 76 detects the boundaries, or transitions, between the time intervals used by the different modulated sub-signals in the composite signal. When the separator detects a sub-signal transition (i.e., the end of an interval used by one sub-signal and/or the beginning of another), selection logic 128 controls demultiplexer 124, so that the currently-beginning sub-signal is forwarded to the appropriate demodulator 80.

The selection logic can use different mechanisms and criteria for differentiating between the different sub-signals interleaved into the received composite signal. Some of these mechanisms are self-contained within separator 76, while others use synchronization indications provided by demodulators 80.

In some embodiments, transmitter 24 inserts silent periods, which separate between adjacent time intervals used by different sub-signals, into the composite signal. Each silent period comprises a time interval in which the transmitter transmits little or no power. A typical silent period duration is on the order of several tens of symbols, although any other suitable duration can be used. In some cases it is sufficient to reduce the transmitted power level by a given amount, such as by 10-20 dB, with respect to the normal average signal power, in order to identify a time interval as a silent period.

In the context of the present patent application and in the claims, the term "silent period" is used to describe any time interval in which the signal power is reduced by a sufficient amount, so as to enable the receiver to detect this interval and use the detection as a boundary indicator. Silent periods can be used in conjunction with either burst modems or stream modems.

In alternative embodiments, the transmitter marks the boundaries between the time intervals used by different sub-signals using sequences of known symbols. For example, when using burst modems, each burst is typically preceded by a preamble, which is produced by modulator 36. Inherently, when the different bursts are combined to form the composite signal, every two adjacent bursts are separated by a preamble. When using stream modems, combiner 44 in transmitter 24 can add appropriate known symbol sequences at the beginning and/or end of each sub-signal interval. In some embodiments, the known symbol sequences are added at the sub-signal level, i.e., at the low data rate. Alternatively, sequences of known samples can be inserted directly into the composite signals, at the high data rate.

Separator 76 in receiver 28 detects the boundary indicators, i.e., the silent periods or known symbol sequences, and switches demultiplexer 124 accordingly. For example, in some embodiments, separator 76 comprises a sample correlator 132, which operates at the high data rate of the composite signal.

When the sub-signals are separated by known symbol sequences, correlator 132 continuously calculates the correlation between the received samples of the composite signal and between the desired known sequence. When correlation is detected, e.g., when the output of the correlator crosses a predetermined threshold, the correlator indicates to selection logic 128 that a boundary is detected. In response, logic 128 routes the currently-beginning sub-signal to the appropriate demodulator by switching demultiplexer 124.

In some embodiments, each sub-signal (and each modulator/demodulator pair) is identified by a unique known symbol sequence. In these embodiments, correlator 132 may indicate the identity of the appropriate demodulator to selection logic 128. Alternatively, all modems and sub-signals may use the same known sequence.

In these embodiments, as well as when using silent periods, after performing suitable initial synchronization, the selection logic and multiplexer 124 typically alternate among the demodulators in sequential order with each detected correlation.

In some embodiments, although not necessarily, selection logic 128 and demultiplexer 124 may use a synchronization mechanism for ensuring that the appropriate demodulator is switched to demodulate each sub-signal. Such synchronization can be carried out by inserting additional symbols at the transmitter, which map each sub-signal or sub-stream to the appropriate demodulator.

When using silent periods, an energy or power detector is used instead of correlator 132. The energy detector calculates the instantaneous power of the composite signal. When the output of the energy detector indicates a silent period (e.g., when the output is lower than a predetermined threshold for a predetermined period of time), the energy detector indicates the detection of a boundary to selection logic 128. Any suitable power detection circuit can be used for this purpose.

In some embodiments, some or all of demodulators 80 are able to provide synchronization-related indications, which can be used by separator 76 to detect sub-signal boundaries.

For example, some demodulators comprise a physical-layer (PHY) correlator 144, which detects correlation with a preamble, midamble or other known symbol sequence used by the modem. The output of the PHY correlator, denoted 'B' in FIG. 3, can sometimes be provided to selection logic 128 and used as a trigger that identifies a sub-signal boundary. Although FIG. 3 shows only one PHY correlator output connected to selection logic 128, the PHY correlator outputs of any or all demodulators 80 can be similarly connected as input to logic 128.

In some cases, such as when using stream modems, sequences of known modulated symbols can be inserted by multiplexer 32 or by combiner 44 in the transmitter, in order to mark the boundaries between sub-signals.

In some embodiments, transmitter 24 inserts known bit sequences into the input data stream in order to mark the boundaries between sub-signals processed by the different modulators and demodulators. For example, when demultiplexer 32 in the transmitter partitions the input data stream into the different sub-streams, it may add a sequence of known bits at the beginning or end of each sub-stream. These bit sequences should not be confused with the known symbol sequences described above, which comprise modulated symbols and not data bits.

Marking sub-stream boundaries (and, consequently, sub-signal boundaries) using known bit sequences can be used, for example, when using stream modems, in which there is no guarantee that each sub-signal begins or ends with a known symbol sequence. Alternatively, in some demodulators it may not be possible or practical to provide the output of the PHY correlator to separator 76. The presence of known bit sequences is usually transparent to the modulator and demodulator. These bit sequences are discarded at the receiver, such as by multiplexer 84.

When the boundaries between sub-signals are marked using known bit sequences, bit correlators 156 at the outputs of demodulators 80 calculate the correlation between the demodulated outputs of the demodulators and the desired bit sequence. The output of the bit correlator, denoted 'C' in the figure, is provided to selection logic 128. The selection logic switches multiplexer 124 based on the detected bit sequence correlations.

Selection logic 128 may use a single boundary indicator (e.g., the output of sample correlator 132, PHY correlator 144 or bit correlator 156) or a combination of indicators in order to control multiplexer 124. For example, when using burst modems, the selection logic may combine the detection of silent periods between bursts, as well as the PHY correlator outputs of the modems, in order to determine the sub-signal boundaries. Any suitable priority, criterion or rule can be used by selection logic 128 to determine the boundaries based on the different indications.

Adaptive Loop Compensation

As noted above, the modulators and demodulators of link 20 are operated in a partial duty cycle. The demodulators often have adaptive loops that estimate the timing, phase and/or frequency offset between the modulator and demodulator, based on the received signal. When modulators 36 and demodulators 80 comprise stream modulators and demodulators, these adaptive loops can be disrupted due the partial duty-cycle in which the modems are operated.

The partial duty-cycle effect is usually more significant in stream modems than in burst modems, since burst modems are already operated in a partial duty-cycle in the first place. Nevertheless, when modulators 36 and demodulators 80 comprise burst modulators and demodulators, the demodulators may use timing, phase and/or frequency offset estimates from previous bursts as initial estimates of the loops in a currently-received burst. These initial estimates can be distorted due the partial duty-cycle in which the modems are operated.

For example, demodulator 80 comprises a carrier phase estimation unit 148, which estimates the carrier phase offset between the demodulator and the corresponding modulator 36. The output of unit 148 is used by a phase correction unit 152 to compensate for this phase offset. In a conventional stream modem, units 148 and 152 continuously track and correct the phase offset over time. When such a modem is operated in link 20, on the other hand, the modem actually performs modulation and demodulation, as well as phase tracking and correction, during only part of the time.

The phase error between the modulator and demodulator, however, continues to accumulate over time, regardless of whether the modem actually operates or not. As a result, the demodulator may encounter a discontinuity in carrier phase at the beginning of each sub-signal interval, which may degrade its performance or even cause it to lose its phase lock.

In some embodiments, demodulator 80 and separator 76 estimate and compensate for the phase that accumulates during the idle period of the demodulator (i.e., from the end of the previous interval to the beginning of the current interval of the sub-signal in question), in order to eliminate or reduce the effect of phase discontinuity. For example, demodulator 80 may estimate the accumulated phase, such as by multiplying the frequency offset between the modulator and demodulator (which is typically calculated by phase estimation unit 148) by the duration of the idle interval. The output of unit 148, denoted 'D' in FIG. 3, is provided to a phase correction unit 160 in separator 76, which shifts the phase of the sub-signal to compensate for the accumulated phase.

In alternative embodiments, when all modulators are synchronized to a single clock and all demodulators are synchronized to a single clock, phase compensation can be applied to the received composite signal, instead of applying separate phase compensation for each sub-signal using units 160. Further alternatively, the phase offset of a stream modem can be estimated from a sequence of known symbols or bits at the beginning of a particular sub-signal interval, and then tracked along the interval, similarly to the operation of a burst modem.

In some cases, other adaptive loops of the stream modem, such as timing recovery or automatic gain control (AGC) may suffer similar discontinuities over the idle intervals. These discontinuities can be compensated for in a similar manner.

Spectral Mask Considerations

Since the data rate of the composite signal is higher than the data rate of the individual sub-signals, the composite signal transmitted over the air occupies a wider bandwidth in comparison with each sub-signal. In many practical cases, however, the spectral response of the composite signal transmitted by transmitter 24 is required not to exceed a certain spectral mask, such as for satisfying a particular spectrum allocation or for complying with a particular standard or air interface.

When the samples of each sub-signal are multiplexed to form the composite signal, the sampling rate of these samples is increased by a certain factor. For example, when three sub-signals sampled at R samples per second are multiplexed, the sampling rate of the composite signal is $3 \cdot R$. Consequently, the spectral response of the composite signal is typically wider than the spectral response of the individual sub-signals by the same factor. Thus, designing each sub-signal to meet a spectral mask that is scaled down from the specified mask by this factor usually ensures that the composite signal meets the specified spectral mask.

Even with properly designed sub-signals, the composite signal may deviate from the specified spectral mask because of the transient response, which is produced when switching from one modulator to another. Some of this transient response is caused by the truncation of the impulse response of a pulse-shaping filter of the modulator. Different measures can be taken in order to reduce or eliminate these transients.

For example, when using burst modems, a guard interval, i.e., a silent period, can be inserted between successive bursts, in order to allow the impulse response of the pulse-shaping filter to decay. The length of this silent period is on the order of the length of the shaping filter, typically several tens of symbols long. At the beginning of the guard interval, the demodulator pulse-shaping filter decays from its value at the end of the previous burst, and the filter ramps up at the end of the guard interval toward the beginning of the next burst.

When using stream modems, the transient response can be reduced by marking the boundaries between sub-signals using a sequence of known symbols, such that the boundary has little or no amplitude/phase discontinuity. For example, the known symbol sequence can be designed so that it is symmetrical with respect to its middle and its length is at least the duration of the transmitter and receiver pulse shaping filters.

Multiple Modem Communication Method Description

Figure 4:
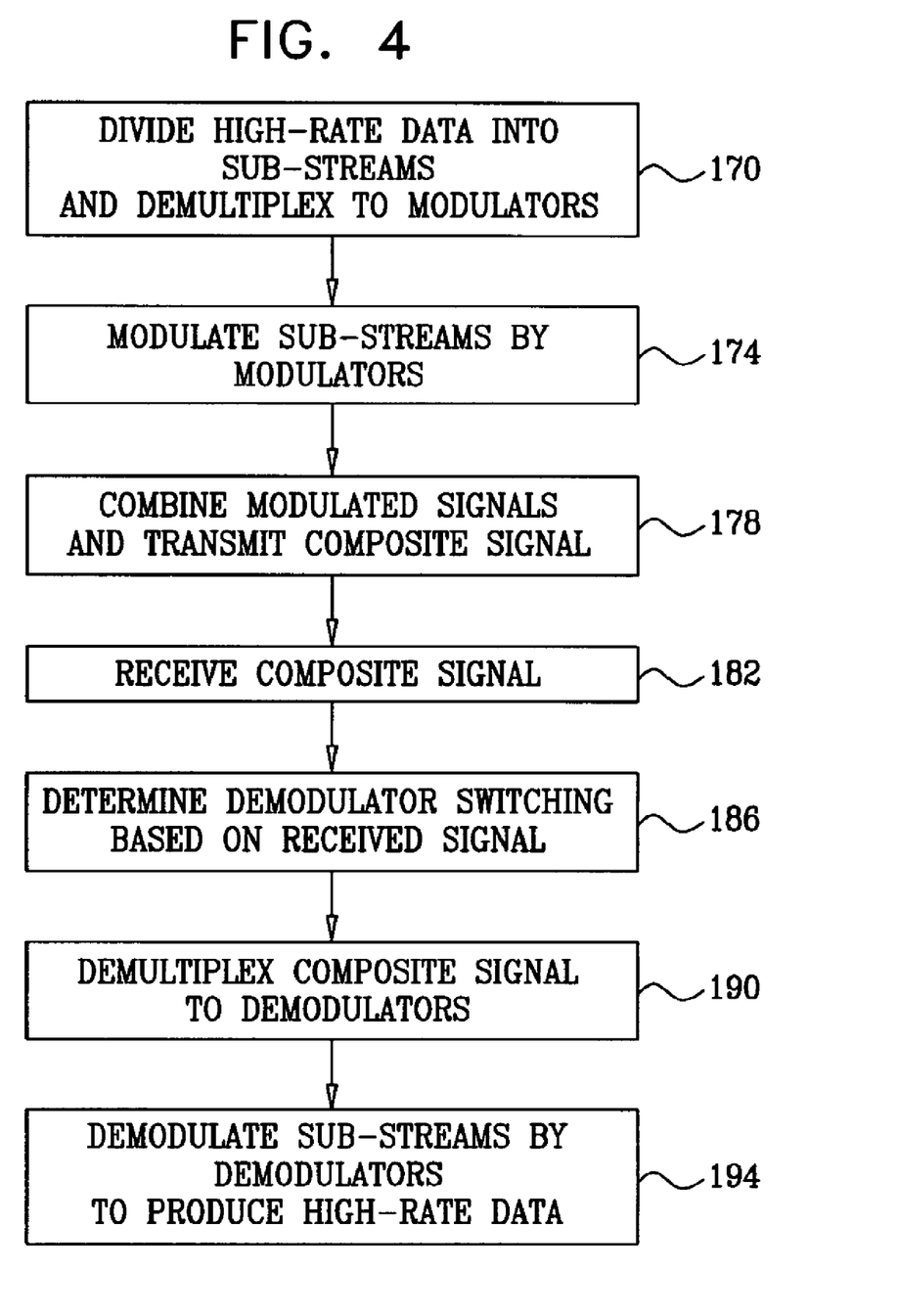
FIG. 4 is a flow chart that schematically illustrates a method for communicating at a high data rate using multiple modems, in accordance with an embodiment of the present invention.

FIG. 4 is a flow chart that schematically illustrates a method for communicating at a high data rate using multiple modems, in accordance with an embodiment of the present invention. The method begins with demultiplexer 32 in transmitter 24 partitioning the input data stream into multiple sub-streams and demultiplexing the sub-streams to modulators 36, at a partitioning step 170. Modulators 36 process the respective sub-streams to produce modulated sub-signals, at a modulation step 174. Combiner 44 interleaves the sub-signals to form a composite signal, and the composite signal is transmitted to receiver 28, at an interleaving and transmission step 178.

Transmitter 24 marks the boundaries between the time intervals used by the different sub-signals using any of the boundary indicators described above, e.g., using silent periods, sequences of known symbols and/or known bit sequences.

Receiver 28 receives the composite signal, at a reception step 182. Separator 76 identifies the boundary indicators inserted by the transmitter, at a boundary identification step 186. The separator may use any of the identification methods and indications described above, e.g., detection of silent periods and/or detection of a correlation with a know bit or symbol sequence. The separator may use its own detection mechanisms (such as using an internal sample correlator) or use synchronization indications provided by demodulators 80.

Based on the identified boundaries, separator 76 demultiplexes the composite signal to reproduce the different sub-signals, and distributes the sub-signals to demodulators 80, at a demultiplexing step 190. The demodulators process the respective sub-signals to reproduce the sub-streams, at a demodulation step 194. Multiplexer 84 combines the sub-streams to reconstruct the high-rate data stream.

Although the embodiments described herein mainly address wireless links, the principles of the present invention can also be used in wireline links, as well as in other high data rate communication applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
receiving a composite signal, which carries data at a first data rate, using a receiver that includes multiple demodulators operating at second data rates that are lower than the first data rate, wherein the composite signal comprises multiple sub-signals that are interleaved in a time domain and are separated by boundary indicators, each boundary indicator instructing a respective demodulator selected from among the multiple demodulators to demodulate a respective sub-signal that follows the boundary indicator in the composite signal;
automatically detecting the boundary indicators between the sub-signals in the composite signal;
responsively to detecting each boundary indicator, switching to demodulate the respective sub-signal that follows the detected boundary indicator by the respective demodulator as instructed by the detected boundary indicator; and
combining multiple output data streams generated by the multiple demodulators so as to reconstruct the data.

2. The method according to claim 1, wherein the composite signal originates from a single transmitter.

3. The method according to claim 1, wherein the demodulators comprise burst demodulators.

4. The method according to claim 1, wherein the demodulators comprise stream demodulators.

5. The method according to claim 1, wherein the boundary indicators comprise silent periods.

6. The method according to claim 5, wherein automatically detecting the boundary indicators comprises calculating an instantaneous power of the received composite signal and detecting the boundary indicators responsively to the calculated instantaneous power.

7. The method according to claim 1, wherein the boundary indicators comprise sequences of known symbols.

8. The method according to claim 7, wherein automatically detecting the boundary indicators comprises calculating correlations between samples of the received composite signal and between the sequences of the known symbols.

9. The method according to claim 7, wherein automatically detecting the boundary indicators comprises accepting one or more correlation indications from one or more of the multiple demodulators, which indicate a correlation between the sub-signals demodulated by the respective demodulators and between the sequences of the known symbols.

10. The method according to claim 1, wherein the boundary indicators comprise sequences of known samples having the first data rate, and wherein automatically detecting the boundary indicators comprises calculating correlations between samples of the received composite signal and between the sequences of the known samples.

11. The method according to claim 1, wherein the boundary indicators comprise sequences of known bits.

12. The method according to claim 1, and comprising demodulating the sub-signals by recovering a timing of the sub-signal by the respective demodulator, wherein receiving the composite signal comprises digitizing the composite signal using an analog-to-digital converter (ADC), and adjusting a sampling clock of the ADC based on the recovered timing.

13. The method according to claim 1, wherein receiving the composite signal comprises digitally recovering a timing of the composite signal.

14. The method according to claim 13, wherein the composite signal comprises a sequence of known samples, and wherein recovering the timing of the composite signal comprises estimating a timing offset in the composite signal by processing the known samples, and correcting the timing offset in the composite signal by applying digital interpolation to the composite signal.

15. The method according to claim 1, wherein the demodulator comprises an adaptive receiver loop used for demodulating the respective sub-signal, and wherein demodulating the sub-signals comprises compensating for an error of the adaptive loop accumulated between successive time intervals of the sub-signal.

16. The method according to claim 15, wherein the adaptive loop comprises a phase recovery loop, and wherein compensating for the error comprises compensating for a phase error accumulated between the successive time intervals of the sub-signal.

17. The method according to claim 15, wherein the adaptive loop comprises a timing recovery loop, and wherein compensating for the error comprises compensating for a timing error accumulated between the successive time intervals of the sub-signal.

18. The method according to claim 1, wherein at least two of the second data rates are different from one another.

19. A method for communication, comprising:
demultiplexing an input data stream having a first data rate into multiple sub-streams having respective second data rates that are lower than the first data rate;
modulating the sub-streams using respective multiple modulators, which operate at the second data rates;
interleaving the modulated sub-streams in a time-domain to produce a modulated composite signal;
inserting between the modulated sub-streams in the composite signal boundary indicators for decoding the composite signal by a receiver that includes multiple demodulators, each boundary indicator instructing the receiver to switch, responsively to automatically detecting the boundary indicator, to demodulate a respective sub-signal that follows the detected boundary indicator in the composite signal by a respective demodulator selected from among the multiple demodulators; and
transmitting the composite signal over a communication link.

20. The method according to claim 19, wherein the boundary indicators comprise at least one indicator type selected from a group of indicator types consisting of silent periods, sequences of known symbols, sequences of known samples and sequences of known bits.

21. The method according to claim 19, wherein modulating the sub-streams comprises causing a spectral response of the composite signal to comply with a given spectral mask by causing the spectral response of each of the sub-streams to comply with a spectrally scaled-down replica of the spectral mask.

22. The method according to claim 21, wherein causing the spectral response of the composite signal to comply with the given spectral mask further comprises separating the sub-signals in the time domain with separators, which comprise at least one separator type selected from a group of types consisting of a guard interval and a symmetric sequence of known symbols.

23. A receiver, comprising:
a front-end, which is arranged to receive a composite signal, which carries data at a first data rate and comprises multiple sub-signals that are interleaved in a time domain;
multiple demodulators, which operate at second data rates that are lower than the first data rate and are arranged to demodulate the respective sub-signals so as to generate respective output data streams;
a separator, which is arranged to automatically detect boundary indicators that separate the sub-signals in the composite signal, each boundary indicator instructing that a respective demodulator selected from among the multiple demodulators is to demodulate a respective sub-signal that follows the boundary indicator in the composite signal, and wherein the separator is arranged, responsively to detecting each boundary indicator, to switch to demodulate the respective sub-signal that follows the detected boundary indicator in the composite signal by a respective demodulator as instructed by the detected boundary indicator; and
a multiplexer, which is configured to combine the output data streams generated by the multiple demodulators so as to reconstruct the data.

24. The receiver according to claim 23, wherein the composite signal originates from a single transmitter, which interleaves the sub-signals and inserts the boundary indicators.

25. The receiver according to claim 23, wherein the demodulators comprise burst demodulators.

26. The receiver according to claim 23, wherein the demodulators comprise stream demodulators.

27. A transmitter, comprising:
a demultiplexer, which is arranged to demultiplex an input data stream having a first data rate into multiple sub-streams having respective second data rates that are lower than the first data rate;
multiple modulators, which respectively operate at the second data rates and are arranged to modulate the sub-streams;
a combiner, which is arranged to interleave the modulated sub-streams in a time-domain to produce a modulated composite signal; and
a boundary marker, which is arranged to insert between the modulated sub-streams in the composite signal boundary indicators for decoding the composite signal by a receiver that includes multiple demodulators, each boundary indicator instructing the receiver to switch, responsively to automatically detecting the boundary indicator to demodulate a respective sub-signal that follows the detected boundary indicator in the composite signal by a respective demodulator selected from among the multiple demodulators.

28. The transmitter according to claim 27, wherein the boundary marker is resident in at least one unit selected from a group of units consisting of the demultiplexer, the modulators and the combiner.

29. The transmitter according to claim 27, wherein the boundary indicators comprise at least one indicator type selected from a group of indicator types consisting of silent periods, sequences of known symbols, sequences of known samples and sequences of known bits.

30. The transmitter according to claim 27, wherein the modulators are arranged to cause a spectral response of the composite signal to comply with a given spectral mask by causing the spectral response of each of the sub-streams to comply with a spectrally scaled-down replica of the spectral mask.

31. A communication link, comprising:

a transmitter, which comprises multiple modulators and is arranged to demultiplex input data having a first data rate into respective sub-streams having second data rates that are lower than the first data rate, to modulate the sub-streams using the respective modulators that operate at the second data rates, to interleave the modulated sub-streams in a time-domain to produce a modulated composite signal, to insert boundary indicators between the modulated sub-streams in the composite signal and to transmit the composite signal; and a receiver, which comprises multiple demodulators that respectively operate at the second data rates and is arranged to receive the composite signal, to automatically detect the boundary indicators, each boundary indicator instructing that a respective demodulator selected from among the multiple demodulators is to demodulate a respective sub-signal that follows the boundary indicator in the composite signal, to switch, responsively to detecting each boundary indicator, to demodulate the respective sub-signal that follows the detected boundary indicator in the composite signal by the respective demodulator as instructed by the detected boundary indicator, to respectively demodulate the sub-signals using the demodulators so as to generate output data streams, and to combine the output data streams generated by the multiple demodulators so as to reconstruct the input data.

32. A method for communication, comprising:

demultiplexing input data having a first data rate into multiple sub-streams having respective second data rates that are lower than the first data rate;

modulating the sub-streams using respective modulators operating at the second data rates;

interleaving the modulated sub-streams in a time-domain to produce a modulated composite signal;

inserting boundary indicators between the modulated sub-streams in the composite signal for decoding the composite signal by a receiver that includes multiple demodulators operating at the second data rates, each boundary indicator instructing the receiver to switch, responsively to automatically detecting the boundary indicator, to demodulate a respective sub-signal that follows the detected boundary indicator in the composite signal by a respective demodulator selected from among the multiple demodulators;

transmitting the composite signal over a communication channel;

receiving the composite signal transmitted over the communication channel in the receiver;

automatically detecting the boundary indicators;

responsively to detecting each boundary indicator, switching to demodulate the respective sub-signal that follows the detected boundary indicator in the composite signal by the respective demodulator, as instructed by the detected boundary indicator, so as to generate output data streams; and combining the output data streams generated by the multiple demodulators so as to reconstruct the input data.

* * * * *

UNITED STATES PATENT AND TRADEMARK OFFICE
CERTIFICATE OF CORRECTION

PATENT NO. : 8,165,008 B2
APPLICATION NO. : 12/416941
DATED : April 24, 2012
INVENTOR(S) : Ridel et al.

Page 1 of 1

It is certified that error appears in the above-identified patent and that said Letters Patent is hereby corrected as shown below:

Column 16
Line 24, Claim 23, please replace "by a the respective demodulator" with --by the respective demodulator--.

Signed and Sealed this
Fifth Day of February, 2013

Teresa Stanek Rea
*Acting Director of the United States Patent and Trademark Office*